United States Patent [19]

Nishihara

[11] Patent Number: 4,968,890
[45] Date of Patent: Nov. 6, 1990

[54] CHARGED PARTICLE BEAM-DOSIMETER

[75] Inventor: Susumu Nishihara, Amagasaki, Japan

[73] Assignee: Mitsubishi Denki Kabushiki Kaisha, Japan

[21] Appl. No.: 379,229

[22] Filed: Jul. 13, 1989

[30] Foreign Application Priority Data

Jul. 18, 1988 [JP] Japan .................................. 63-176993
Jul. 27, 1988 [JP] Japan .................................. 63-185571

[51] Int. Cl.$^5$ .............................................. G01T 1/185
[52] U.S. Cl. ...................................... 250/374; 250/388
[58] Field of Search ................................... 250/374, 388

[56] References Cited

U.S. PATENT DOCUMENTS 3,959,653  5/1976  Lee et al. ............................. 250/374
4,454,423  6/1984  Koob .................................... 250/374

FOREIGN PATENT DOCUMENTS 56-11376  2/1981  Japan .
57-179771  11/1982  Japan .

Primary Examiner—Carolyn E. Fields
Attorney, Agent, or Firm—Leydig, Voit & Mayer

[57] ABSTRACT

This invention relates to a charged particle beam-dosimeter comprising an ionization chamber which produces an ionization current having a magnitude proportional to the dose of a charged particle beam, an operational amplifier which is connected to the output side of the ionization chamber, a capacitor which is connected in parallel with the operational amplifier, and a comparator which is connected to the output terminal of the operational amplifier, wherein charges are collected in the capacitor on the basis of the ionization current having flowed from the ionization chamber, and when the output potential of the operational amplifier has become a predetermined voltage, one pulse is generated so as to be counted and simutaneously to extinguish the charges stored in the capacitor.

3 Claims, 3 Drawing Sheets

CHARGED PARTICLE BEAM-DOSIMETER

BACKGROUND OF THE INVENTION

This invention relates to a dosimeter for measuring the dose of a charged particle beam, and more particularly to a charged particle beam-dosimeter which has a wide dynamic range without changing-over the ranges.

FIG. 3 is a circuit diagram, partly in blocks, showing a charged particle beam-dosimeter in the prior art. As shown in the figure, the charged particle beam-dosimeter in the prior art comprises an ionization chamber 2 which produces an ionization current having a magnitude proportional to the dose of a charged particle beam 1, an operational amplifier 3 the inverting input terminal of which is connected to the ionization chamber 2 and the noninverting input terminal of which is grounded, a group of resistors 4 which are connected in parallel with the operational amplifier 3, specifically between the inverting input terminal and the output terminal thereof, a group of relays 5 which serve to switch the group of resistors 4, a transfer switch 6 which serves to select the group of relays 5, a voltage-to-frequency converter 7 which is connected to the output terminal of the operational amplifier 3, and a counter 8 which is connected to the output side of the voltage-to-frequency converter 7. Further, the group of resistors 4 consist of resistors $R_1$, $R_2$, $R_3$ and $R_4$ which are respectively connected in series with a plurality of, for example, four relay contacts $RY_{1a}$, $RY_{2a}$, $RY_{3a}$ and $RY_{4a}$, and the individual series circuits are connected in parallel with one another. The group of relays 5 consist of four relays in total, $RY_1$, $RY_2$, $RY_3$ and $RY_4$ which correspond respectively to the aforementioned relay contacts $RY_{1a}$, $RY_{2a}$, $RY_{3a}$ and $RY_{4a}$, and the individual relays are connected in parallel with illustrated diodes between a power source + and the respective stationary contacts $S_1$, $S_2$, $S_3$ and $S_4$ of the transfer switch 6.

With the charged particle beam-dosimeter of the prior art constructed as explained above, when the movable contact piece M of the transfer switch 6 is moved from its illustrated state so as to come into touch with the stationary contact $S_2$, the relay $RY_2$ is energized and its relay contact $RY_{2a}$ is closed by current which flows from the power source + to ground through the relay $RY_2$, stationary contact $S_2$ and movable contact piece M. Consequently, the resistor $R_2$ is electrically connected in parallel with the operational amplifier 3. When, under this state, the ionization chamber 2 feeds the node between the inverting input terminal of the operational amplifier 3 and the group of resistors 4 with the ionization current $I_s$ whose magnitude is proportional to the dose of the charged particle beam 1, the fed current $I_s$ is consumed by a voltage drop across the resistor $R_2$, and the operational amplifier 3 balances at an output voltage at which the node becomes 0 V. Accordingly, the measurement current range of the dosimeter is determined by the resistance of the resistor $R_2$ and the supply voltage of the operational amplifier 3. The above output voltage is expressed by $R_2 \cdot I_s$, and the sign thereof becomes minus in the direction in which the current $I_s$ flows from the ionization chamber 2 to the node, whereas it becomes plus in the direction in which the current flows from the node into the ionization chamber 2. When the resistance of the resistor $R_2$ is set at 10 k$\Omega$, the sensitivity of the dosimeter is 100 $\mu$A/V. In a case where the range is to be changed-over, the movable contact piece M is brought into touch with the stationary contact $S_1$ or $S_3$, and the relay $RY_1$ or $RY_3$ is energized to close its relay contact $RY_{1a}$ or $RY_{3a}$. Thus, when the resistor $R_1$ of 1 k$\Omega$ and the resistor $R_3$ of 100 k$\Omega$ are used by way of example, the sensitivities become 1 mA/V and 10 $\mu$A/V, respectively. However, the maximum sensitivity of the dosimeter is restricted by the input bias current of the operational amplifier 3, while the minimum sensitivity is restricted by the lowest load resistance thereof. The output voltage of the operational amplifier 3 is converted into a frequency by the voltage-to-frequency converter 7, and the frequency is counted by the counter 8.

As stated above, the charged particle beam-dosimeter of the prior art has had such a problem that the ranges must be changed-over on each occasion in order to change the sensitivity.

SUMMARY OF THE INVENTION

This invention has been made in order to solve the problem as mentioned above, and has for its object to provide a charged particle beam-dosimeter which has a wide dynamic range without changing-over the ranges.

A charged particle beam-dosimeter according to this invention comprises an ionization chamber, an operational amplifier which is connected to an output side of said ionization chamber, a capacitor which is connected in parallel with said operational amplifier, a comparator which is connected to an output terminal of said operational amplifier, and circuit means for generating one pulse when an output potential of said operational amplifier has become a predetermined voltage, and for counting the generated pulses and simultaneously extinguishing the charges stored in said capacitor.

BRIEF DESCRIPTION OF THE DRAWINGS

Throughout the drawings, the same symbols indicate identical or equivalent portions.

DESCRIPTION OF THE PREFERRED EMBODIMENTS

Figure 1:
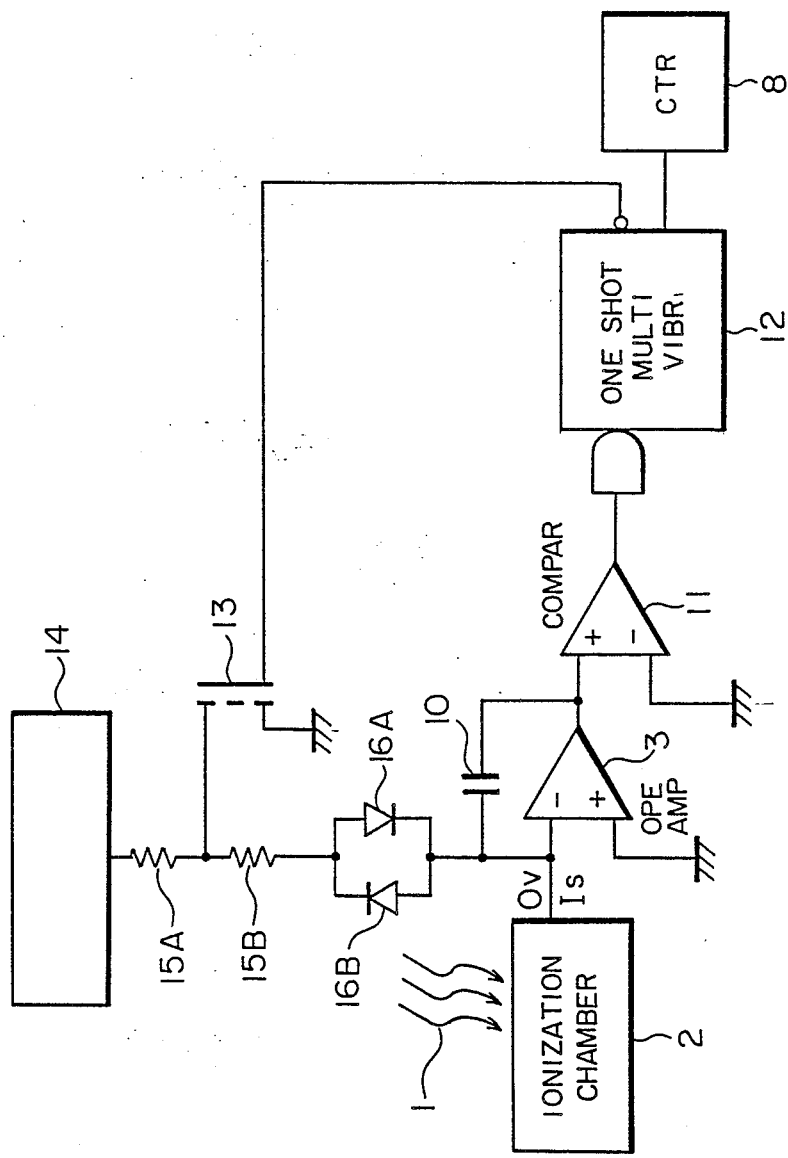
FIG. 1 is a circuit diagram showing a charged particle beam-dosimeter according to a first embodiment of this invention.

FIG. 1 is a circuit diagram showing the first embodiment of a charged particle beam-dosimeter according to this invention. In addition to an ionization chamber 2, an operational amplifier 3 and a counter 8, similar to those of the prior-art dosimeter, the charged particle beam-dosimeter of this embodiment comprises a capacitor 10 which is connected in parallel with the operation amplifier 3, a comparator 11 the noninverting input terminal of which is connected to the output terminal of the operational amplifier 3 and the inverting input terminal of which is grounded, a one-shot multivibrator 12 which is connected to the output side of the comparator 11, a FET (field-effect transistor) switch 13 the gate terminal of which is connected to one output terminal, for example, the negative logic pulse-output terminal of the one-shot multivibrator 12 and one output terminal, for example, the source terminal of which is grounded, a regulated current source 14, two resistors 15A and 15B which are connected in series with each other on the output side of the regulated current source 14 and the node of which is connected to the other output terminal, for example, the drain terminal of the FET switch 13, and diodes 16A and 16B which are connected in inverse parallel relationship with each other between the latter resistor 15B and the inverting input terminal of the operational amplifier 3. Further, the counter 8 is connected to the positive logic pulse-output terminal of the one-shot multivibrator 12.

In the charged particle beam-dosimeter constructed as described above, the ionization chamber 2 feeds the operational amplifier 3 with an ionization current $I_s$ whose magnitude is proportional to the dose of a charged particle beam 1, and charges are collected by the capacitor 10 which is connected in parallel with the operational amplifier 3. When the output potential of the operational amplifier 3 has become a predetermined voltage in this way, the comparator 11 generates one pulse. This pulse is converted into positive and negative logic pulses by the one-shot multivibrator 12. One of these pulses, for example, the positive logic pulse is counted as an output by the counter 8, while the other pulse, namely, the negative logic pulse is fed back to the FET switch 13. In case of a high level, the negative logic pulse turns ON the FET switch 13, whereby current from the regulated current source 14 is caused to flow to ground. On the other hand, in case of a low level, the negative logic pulse turns OFF the FET switch 13, whereby the current from the regulated current source 14 is caused to flow into the input terminal of the operational amplifier 3 through the resistors of fixed resistances 15A and 15B and the bidirectional diodes 16A and 16B this time, so that the charges stored in the capacitor 10 are extinguished. Thereafter, the capacitor 10 begins to store charges again, and the process described above is repeated.

As understood from the foregoing, the operational amplifier 3, capacitor 10 and comparator 11 constitutes a current-to-pulse conversion circuit which collects the charges in the capacitor 10 on the basis of the ionization current $I_s$ having flowed from the ionization chamber 2, and which generates one pulse when the output potential of the operational amplifier 3 has reached the predetermined voltage. Besides, the one-shot multivibrator 12 serves as pulse conversion means for converting the single pulse from the current-to-pulse conversion circuit into the positive and negative logic pulses. Further, the FET switch 13, resistors 15A, 15B and diodes 16A, 16B constitute switch means operating at the turn-ON of the FET switch 13 to bypass the current from the regulated current source 14 to ground and operating at the turn-OFF thereof to cause the current from the regulated current source 14 to flow into the operational amplifier 3, thereby to extinguish the charges stored in the capacitor 10.

As described above in detail, the first embodiment of this invention comprises an ionization chamber which produces an ionization current having a magnitude proportional to a dose of a charged particle beam; a current-to-pulse conversion circuit which includes an operational amplifier connected to an output side of said ionization chamber, a capacitor connected in parallel with said operational amplifier, and a comparator connected to an output terminal of said operational amplifier, and which generates a single pulse when an output potential of said operational amplifier has become a predetermined voltage; pulse conversion means connected to an output side of said current-to-pulse conversion circuit, for converting the single pulse into positive and negative logic pulses; a regulated current source; switch means connected to said regulated current source, said operational amplifier and said pulse conversion means, said switch means being controlled ON/OFF by one of the logic pulses from said pulse conversion means; and a counter which is connected to said pulse conversion means and which counts the other logic pulse thereof. Therefore, the embodiment achieves the effect that a charged particle beam-dosimeter having a wide dynamic range is provided.

Figure 2:
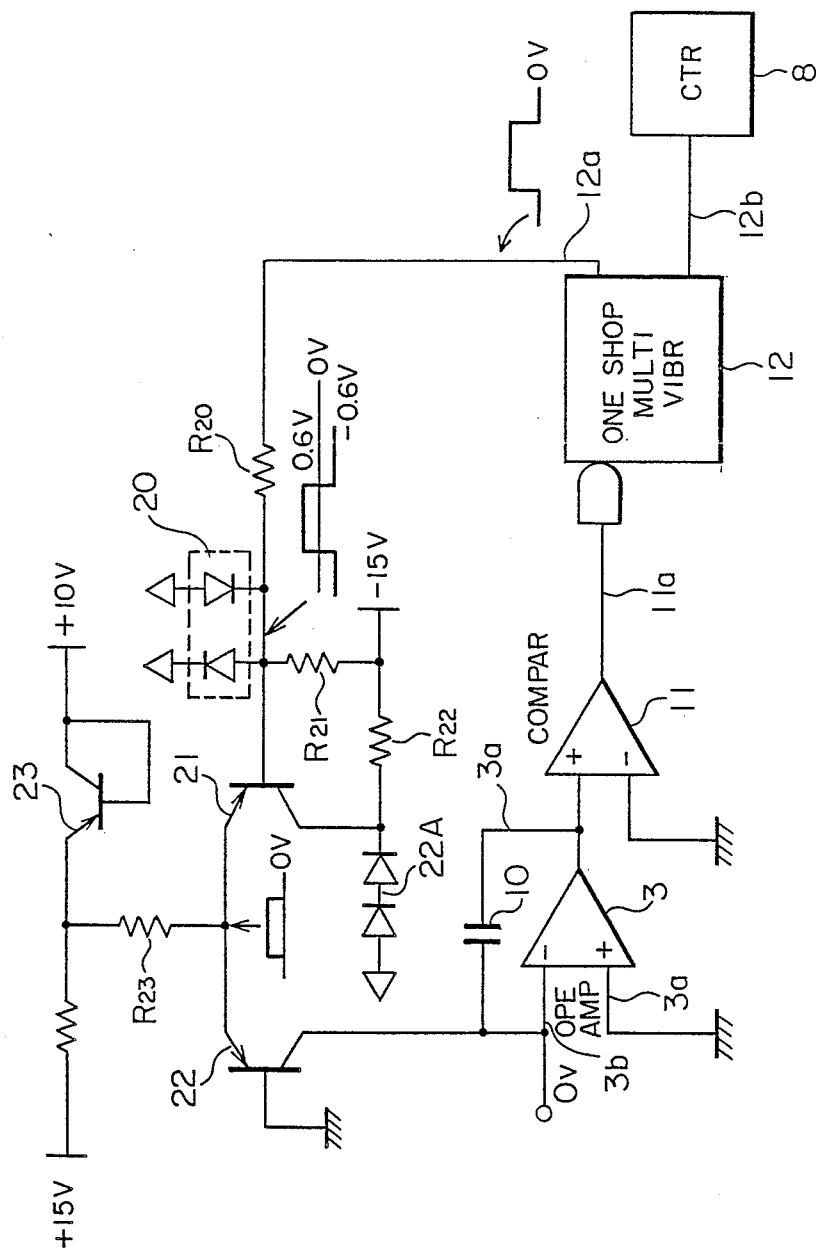
FIG. 2 is a circuit diagram of a charged particle beam-dosimeter showing a second embodiment.
Figure 3:
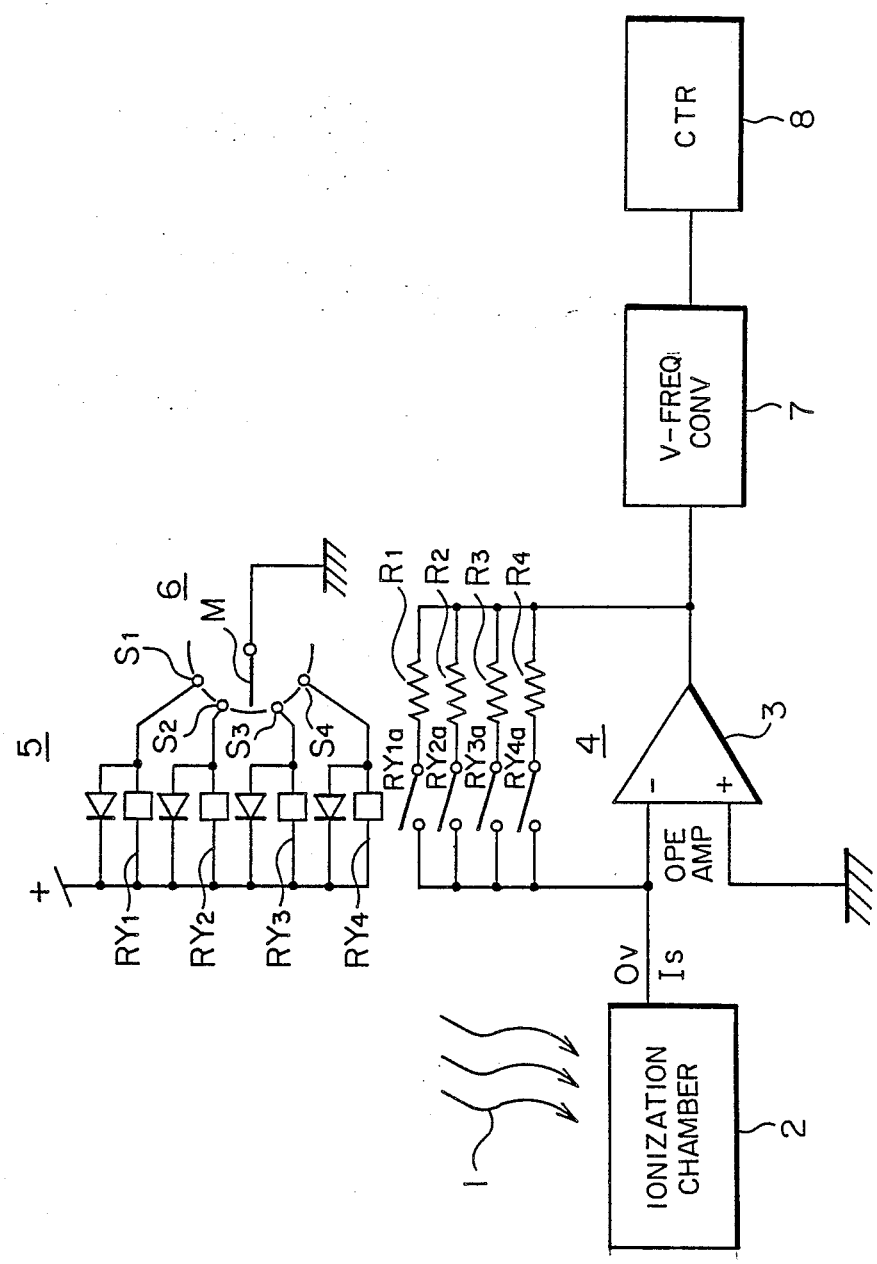
FIG. 3 is a circuit diagram showing a charged particle beam-dosimeter in the prior art.

FIG. 2 is a circuit diagram showing another embodiment of this invention. Referring to the figure, numeral 3 designates an operational amplifier which receives a current input from an ionization chamber (not shown), numeral 10 a capacitor which is connected in parallel with the operational amplifier 3, numeral 11 a comparator which is connected to the operational amplifier 3, numeral 12 a one-shot multivibrator which converts a pulse signal 11a from the comparator 11 into a positive logic pulse 12a and a negative logic pulse 12b, numeral 8 a counter which counts the negative logic pulse 12b, and numeral 20 a pair of diodes which are connected in parallel with each other in oppoite directions with respect to ground and to which the positive logic pulse 12a is transmitted through a resistor $R_{20}$ of fixed resistance. Numeral 21 indicates a first switching transistor which is connected to the diodes 20, numeral 22 a second switching transistor which is connected to the first switching transistor 21 and whose base is grounded, and symbol 22A series diodes which are connected to the diodes 20 through series resistors $R_{21}$ and $R_{22}$.

Now, the operation of this embodiment will be described. First, the current input based on an ionization current flowing from an unshown ionization chamber is fed into the operational amplifier 3, and charges are collected by the capacitor 10. When the potential of the output 3a of the operational amplifier 3 has become a predetermined voltage, the pulse signal 11a formed of a single pulse is generated by the comparator 11. The pulse signal 11a is converted into the positive logic pulse 12a and the negative logic pulse 12b by the one-shot multivibrator 12. The negative logic pulse 12b is impressed as an output on the counter 8. The positive logic pulse 12a has its zero voltage (a low level of 0 V) and its positive voltage (a high level) turned into a minus voltage ($\approx -0.6$ V$\times$ the number of the diodes) and a plus voltage ($\approx +0.6$ V$\times$ the number of the diodes), respectively, by the parallel diodes 20 corrected to opposite to each other with respect to ground, as illustrated by waveforms. The minus voltage and the plus voltage are applied to the base of the first switching transistor 21, whereby when the potential of this base is the minus voltage, the first switching transistor 21 turns "on" and causes current from a regulated current source to flow, and when the potential is the plus voltage, the transistor 21 turns "off." Since the second switching transistor 22 has its base grounded, it causes no current to flow therethrough in the "on" state of the first switching transistor 21. In contrast, while the first switching transistor 21 is in the "off" state, the second switching transistor 22 causes the current of the regulated current source to flow into the inverting input side 3b of the operational amplifier 3 through a resistor $R_{23}$ of fixed resistance, so that the charges stored in the capacitor 10 are extinguished. Thereafter, the capacitor 10 begins to store charges again, and the same operation is repeated. By the way, a third transistor 23 is inserted for the temperature compensation of the second switching transistor 22.

As described above, according to the second embodiment of this invention, a charged particle beam-dosimeter comprises a capacitor which is connected in parallel with an operational amplifier having an input current fed thereinto, a comparator which delivers a pulse signal when its output has reached a predetermined potential, and a one-shot multivibrator which converts the pulse signal into positive and negative logic pulses, wherein the negative logic pulses are counted by a counter, and the positive logic pulses are fed back through parallel diodes, so as to turn "on" a switching transistor by the use of the plus voltage level of the positive logic pulse, whereby current is caused to flow from a regulated current source to the input of the operational amplifier through a resistor of fixed resistance. As in the case of the first embodiment, therefore, the charged particle beam-dosimeter has a wide dynamic range and makes it unnecessary to change-over the ranges as in the prior art.

What is claimed is:

1. A charged particle beam-dosimeter comprising an ionization chamber which produces an ionization current having a magnitude proportional to a dose of a charged particle beam, an operational amplifier which is connected to an output side of said ionization chamber, a capacitor which is connected in parallel with said operational amplifier and stores charge and increases output potential of said operational amplifier on the basis of the ionization current produced in said ionization chamber, a comparator which is connected to an output terminal of said operational amplifier and which produces a single output pulse when the output potential of said operational amplifier has become a predetermined voltage, means responsive to the single output pulse from said comparator for generating positive and negative logic pulses, counting means responsive to one of said logic pulses for producing an output representing dose magnitude, a regulated current source, and switch means operated responsive to the other of said logic pulses to connect said regulated current source to extinguish the charge stored on said capacitor, whereby the dose meter is operative to measure charged particle beam dose over a wide dynamic range.

2. A charged particle beam-dosimeter comprising an ionization chamber which produces an ionization current having a magnitude proportional to a dose of a charged particle beam; a current-to-pulse conversion circuit which includes an operational amplifier connected to an output side of said ionization chamber, a capacitor connected in parallel with said operational amplifier, and a comparator connected to an output terminal of said operational amplifier, and in which charges are collected in said capacitor on the basis of the ionization current having flowed from said ionization chamber, said comparator generating a single pulse when an output potential of said operational amplifier has become a predetermined voltage; pulse conversion means connected to an output side of said current-to-pulse conversion circuit, for converting the single pulse into positive and negative logic pulses; a regulated current source; switch means connected to said regulated current source, said operational amplifier and said pulse conversion means, said switching means being controlled ON/OFF by one of the logic pulses from said pulse conversion means, so that in the ON state, current from said regulated current source is bypassed to the ground, while in the OFF state, the current from said regulated current source is caused to flow into an input terminal of said operational amplifier, thereby to extinguish the charges stored in said capacitor; and a counter which is connected to said pulse conversion means and which counts the other logic pulse thereof.

3. In a charged particle beam-dosimeter wherein an ionization current fed from an ionization chamber is converted into a waveform of single pulse every predetermined amount of charges; a charged particle beam-dosimeter characterized by comprising an operational amplifier into which the input current is fed, a capacitor which is connected in parallel with said operational amplifier and which collects charges on the basis of the input current, a comparator which is connected to said operational amplifier and which generates a pulse signal when a potential of an output of said operational amplifier has become a predetermined voltage, a one-shot multivibrator which converts the pulse signal into a positive logic pulse and a negative logic pulse, a pair of diodes which are connected in opposite directions to each other with respect to ground and which receive the positive logic pulse so as to turn a zero voltage level and a plus voltage level thereof into a minus voltage and a plus voltage, respectively, a first switching transistor and a second switching transistor which are connected to said diodes, and a resistor of fixed resistance which is connected to said diodes, whereby current of a regulated current source is supplied to an input of said operational amplifier through said switching transistors by the use of the plus voltage so as to extinguish the charges stored in said capacitor.

* * * * *